US008451901B2

(12) United States Patent
Lee et al.

(10) Patent No.: US 8,451,901 B2
(45) Date of Patent: May 28, 2013

(54) HIGH-SPEED MOTION ESTIMATION APPARATUS AND METHOD

(75) Inventors: Suk Ho Lee, Daejeon (KR); Seong Mo Park, Daejeon (KR); Sang Heon Lee, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1002 days.

(21) Appl. No.: 12/495,626

(22) Filed: Jun. 30, 2009

(65) Prior Publication Data

US 2010/0118961 A1    May 13, 2010

(30) Foreign Application Priority Data

Nov. 11, 2008 (KR) ........................ 10-2008-0111627

(51) Int. Cl.
 *H04N 7/12* (2006.01)
 *H04N 19/00509* (2006.01)

(52) U.S. Cl.
 USPC ................................................... 375/240.16

(58) Field of Classification Search
 None
 See application file for complete search history.

(56) References Cited

U.S. PATENT DOCUMENTS

| 6,850,569 | B2 | 2/2005 | Park et al. | |
|---|---|---|---|---|
| 8,073,057 | B2* | 12/2011 | Ohgose et al. | 375/240.16 |
| 2002/0085635 | A1 | 7/2002 | Kim et al. | |
| 2005/0149690 | A1 | 7/2005 | Kang | |
| 2005/0276330 | A1* | 12/2005 | Park et al. | 375/240.17 |
| 2006/0120455 | A1 | 6/2006 | Park et al. | |
| 2007/0076795 | A1 | 4/2007 | Lee | |
| 2007/0165716 | A1 | 7/2007 | Kitamura et al. | |
| 2008/0123744 | A1 | 5/2008 | Pearson | |
| 2008/0181310 | A1 | 7/2008 | Choi et al. | |
| 2009/0180543 | A1* | 7/2009 | Tsuda et al. | 375/240.16 |
| 2011/0032993 | A1* | 2/2011 | Ozawa et al. | 375/240.16 |

FOREIGN PATENT DOCUMENTS

| JP | 7-508605 | | 9/1995 |
|---|---|---|---|
| JP | 2007-129370 | A | 5/2007 |
| JP | 2007-189518 | | 7/2007 |
| KR | 2002-0054452 | A | 7/2002 |
| KR | 2005-0020287 | A | 3/2005 |
| KR | 2005-0068770 | A | 7/2005 |
| KR | 2006-0064509 | | 6/2006 |
| KR | 2007-0037531 | | 4/2007 |
| KR | 2008-0070374 | | 7/2008 |
| WO | WO-93/25972 | A1 | 12/1993 |

OTHER PUBLICATIONS

Dong-Xiao Li et al., "Architecture Design for H.264/AVC Integer Motion Estimation with Minimum Memory Bandwidth", IEEE Transactions on Consumer Electronics, vol. 53, No. 3, Aug. 2007, pp. 1053-1060.

* cited by examiner

*Primary Examiner* — Nhon Diep
(74) *Attorney, Agent, or Firm* — Rabin & Berdo, P.C.

(57) ABSTRACT

A high-speed motion estimation apparatus includes a current region memory, an integer-times motion estimation unit, and a decimal-times motion estimation unit. The current region memory receives pixel data of a current region from an external frame memory to store the pixel data. The integer-times motion estimation unit stores pixel data of an estimation region which are read from the frame memory, and predicts an integer-times motion vector by using the pixel data of the current region and the pixel data of the estimation region. The decimal-times motion estimation unit reads the pixel data of the estimation region, and predicts a decimal-times motion vector by using the read pixel data and the predicted integer-times motion vector.

7 Claims, 8 Drawing Sheets

HIGH-SPEED MOTION ESTIMATION APPARATUS AND METHOD

CROSS-REFERENCE TO RELATED APPLICATIONS

This application claims the priority of Korean Patent Application No. 2008-111627 filed on Nov. 11, 2008, in the Korean Intellectual Property Office, the disclosure of which is incorporated herein by reference.

BACKGROUND OF THE INVENTION

1. Field of the Invention

The present invention relates to an estimation of a high-speed motion in an encoder for the compression of a picture, and more particularly, to a high-speed motion estimation apparatus and method, which have a sharable multiple input/output bank memory structure.

2. Description of the Related Art

An encoder for the compression of a picture (hereinafter, referred to as "a picture encoder") estimates motion by macroblock unit of a specific pixel size, and predicts a motion vector of a position where the value of a Sum of Absolute Differences (hereinafter, referred to as "SAD") between macroblocks is the minimum. Herein, the macroblock includes a pixel having a specific position which is in a current picture (original picture) and a restored picture within a motion-estimation range (reference picture).

In a related art picture encoder, the pixel data of an original picture and a reference picture necessary for inter prediction increase relatively as the resolution of pictures increases. Consequently, the picture encoder stores the pixel data of a reference picture in an external frame memory having a large storage capacity, and reads and calculates the pixel data of the original picture and the pixel data of the reference picture, which are stored in the frame memory, with a motion estimation apparatus.

In the picture encoder, decimal-times motion estimation is performed after integer-times motion estimation by an integer-times motion estimation apparatus. Accordingly, after the integer-times motion estimation, the integer-times motion estimation apparatus again calculates the SAD of the original picture and the reference picture of an estimation range which is made by adding a periphery estimation range for pixel interpolation to a predicted periphery pixel range of an integer-times motion vector, and predicts a final decimal-times motion vector by use of the calculated SAD. The motion estimation prediction of the picture encoder will be described in detail with reference to FIG. 1 below.

Figure 1:
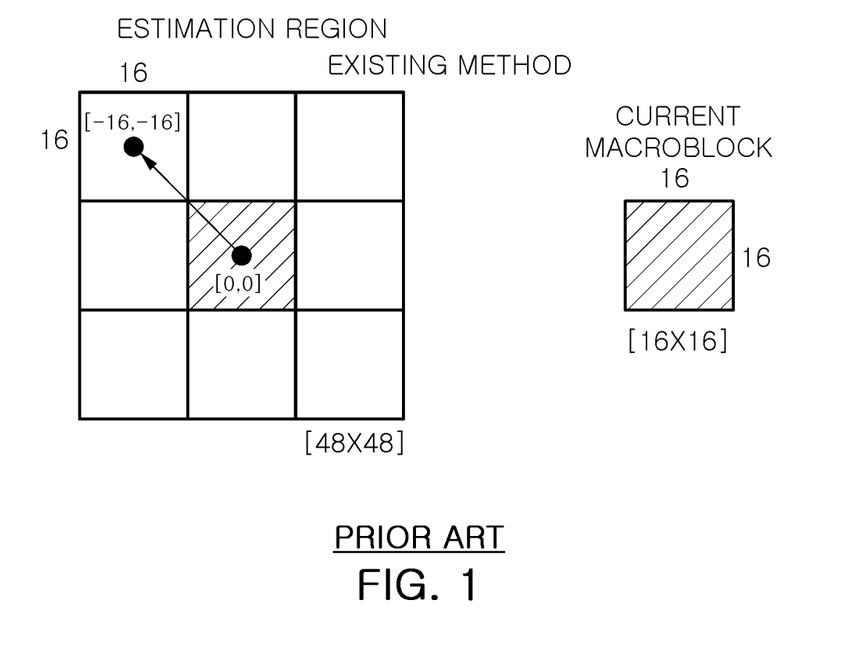
FIG. 1 is a diagram illustrating a related art motion estimation method.

The basic size of a macroblock necessary for general integer-times motion estimation uses 16×16 pixel data, and the range of one pixel uses 8 bits. The integer-times motion estimation apparatus calculates the SAD of a macroblock unit on the candidate pixel values of all estimation regions in the regions of the range of −16 to +15 in an X direction and the range of −16 to +15 in a Y direction, and predicts a motion vector by use of the calculated SAD. At this point, a clock cycle necessary for reading data from the frame memory, as illustrated in FIG. 1, requires a 64 clock cycle in reading the pixel data of a 16×8 bit (pixel)×16 (line) when one word is 64 bits on the original picture. Moreover, in the case of the reference picture of the estimation range, the clock cycle requires a 572 clock cycle in reading the pixel data of a 48×8 bit (pixel)×48 (line). The clock cycle is an ideal numerical value.

The integer-times motion estimation requires more clock cycles, because a delay time, occurring according to the storage position of pixel data, is additionally required when reading data from an actual frame memory (for example, a Synchronous Dynamic Random Access Memory (SDRAM) or a Double Data Rate (DDR) memory).

Upon calculation of the SAD, a 1024 clock cycle is required in an X and Y estimation range (32×32) because of the performance of calculations on the pixel values of all estimation regions.

The picture encoder must identically read the pixel data of an estimation region from the frame memory for decimal-times estimation. For this, the picture encoder uses a 6-tap filter. The 6-tap filter is for performing ¼ pixel interpolation in the periphery of an integer-times motion vector. Since the 6-tap filter requires additional periphery pixel data, it requires an estimation region pixel data of a 22×8 bit (pixel)×22 (line) from the frame memory for decimal-times motion estimation. In addition, a 121 clock cycle is required for reading the estimation-region pixel data. In the decimal-times estimation, the performance of the picture encoder may be deteriorated because the calculation time of the SAD and the input/output time of the frame memory are primarily focused upon the prediction of motion estimation.

In the picture encoder, a motion estimation apparatus requires more pixel data from the frame memory than other devices (for example, an intra prediction device or a distortion removing filter) of the picture encoder necessary for the entirety of the encoding.

The picture encoder performs encoding on a pipeline of a macroblock unit, and other devices of the picture encoder also require the pixel data of the frame memory at the same time state on the pipeline. Therefore, in the case of the picture encoder, due to the limited bandwidth of the memory, the input/output function of a stored memory may become bottlenecked. Consequently, a motion estimation apparatus may not be able to read the pixel data necessary for a calculation from the frame memory within a predetermined time upon estimation of motion.

Moreover, the picture encoder must perform a calculation in consideration of all the candidate pixel values of an estimation region when calculating the SAD for obtaining a motion vector. Accordingly, the picture encoder requires a large amount of calculations, and thus, since much processing time is taken per macroblock, delayed processing time deteriorates the overall performance of the picture encoder.

SUMMARY OF THE INVENTION

An aspect of the present invention provides a high-speed motion estimation apparatus and method, which can minimize inputs/outputs with an external frame memory by using a sharable multiple input/output bank memory structure.

Another aspect of the present invention provides a high-speed motion estimation apparatus and method, which simultaneously receive and output pixel data necessary for the calculation of a Sum of Absolute Differences (SAD) from/to a storage device having a multiple input/output bank memory structure, thereby estimating motion at high speed.

Another aspect of the present invention provides a high-speed motion estimation apparatus and method, which can decrease the number of pixels and an estimation range necessary for the calculation of the SAD while not deteriorating the quality of pictures upon the prediction of a motion vector.

According to an aspect of the present invention, there is provided a high-speed motion estimation apparatus, including: a current region memory, receiving pixel data of a current region from an external frame memory to store the pixel data; an integer-times motion estimation unit storing pixel data of an estimation region which is read from the frame memory in a sharable multiple input/output bank type, and predicting an integer-times motion vector by using the pixel data of the current region and the pixel data of the estimation region; and a decimal-times motion estimation unit reading the pixel data of the estimation region from the integer-times motion estimation unit, and predicting a decimal-times motion vector by use of the read pixel data of the estimation region and the integer-times motion vector predicted by the integer-times motion estimation unit, when an estimation region sharable signal is received from the integer-times motion estimation unit.

According to another aspect of the present invention, there is provided a high-speed motion estimation method for estimating a motion of a picture at high speed in a high-speed motion estimation apparatus including an integer-times motion estimation unit and a decimal-times motion estimation unit, the high-speed motion estimation method including: receiving, via the integer-times motion estimation unit, pixel data of a picture for the estimation of a motion from an external frame memory; storing, by the integer-times motion estimation unit, pixel data of a current region in a current macroblock storage where multiple inputs/outputs are made, and storing pixel data of an estimation region in an estimation region macroblock storage of a sharable multiple input/output bank type, among the pixel data of the picture; predicting, by the integer-times motion estimation unit, an integer-times motion vector by using the stored pixel data of the current region and the stored pixel data of the estimation region; reading, the decimal-times motion estimation unit, the pixel data of the estimation region from the estimation region macroblock storage which is sharable; and predicting, by the decimal-times motion estimation unit, a decimal-times motion vector by using the read pixel data of the estimation region and the integer-times motion vector.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. In the following description, when the detailed description of the relevant known function or configuration is determined to be unnecessarily obscure, the most important point of the present invention, the detailed description, will be omitted.

Figure 2:
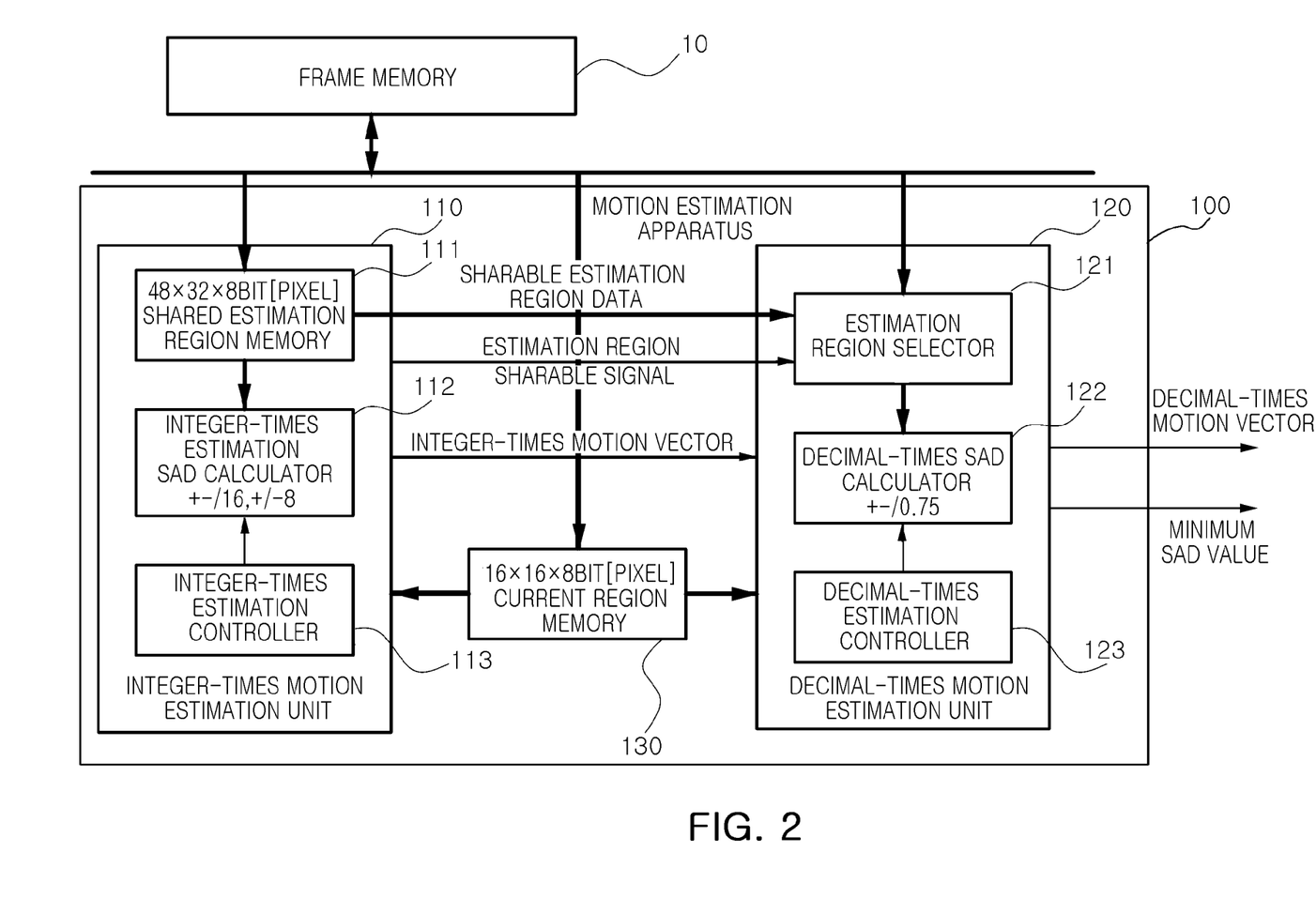
FIG. 2 is a diagram illustrating the configuration of a motion estimation apparatus according to an embodiment of the present invention.
Figure 3:
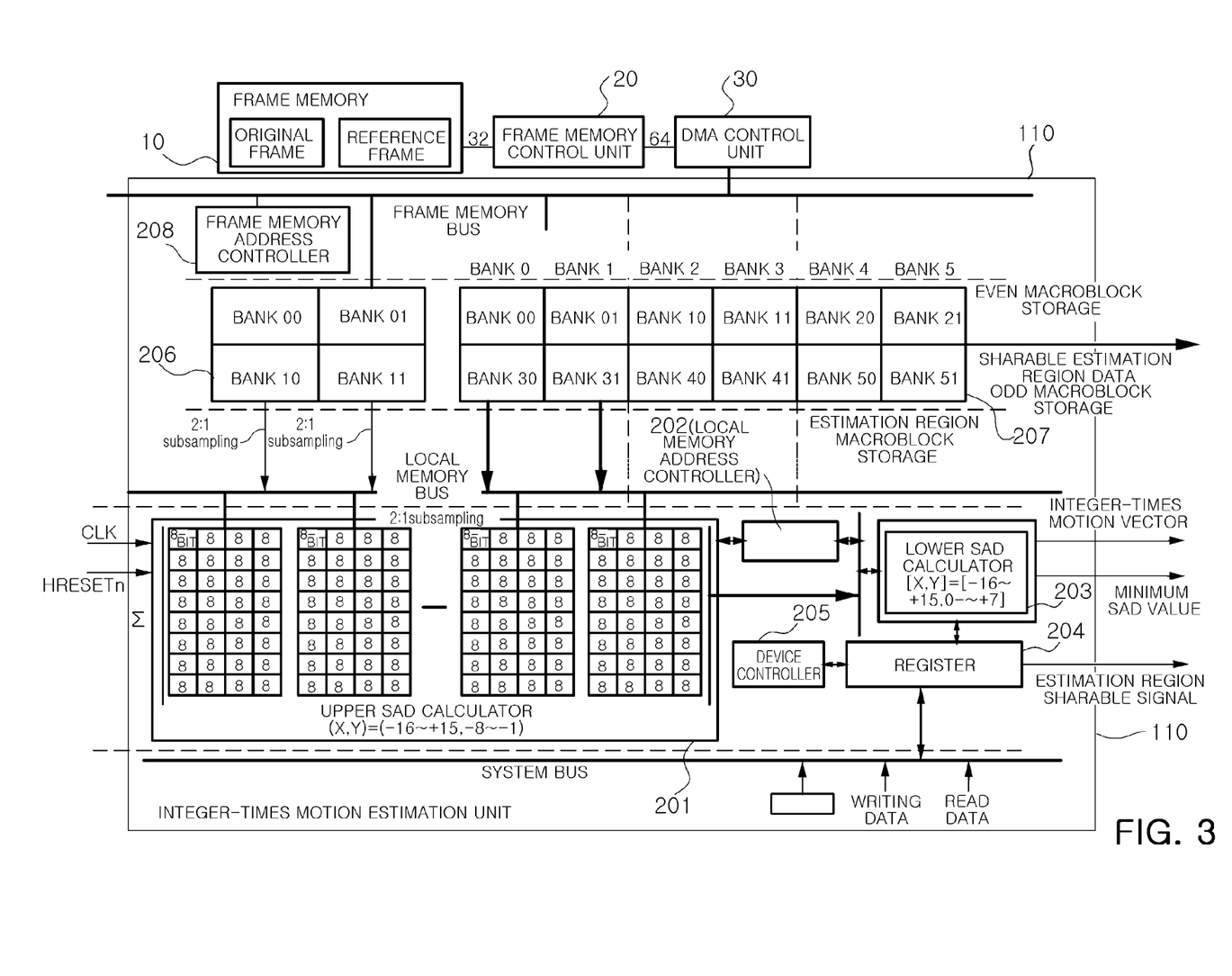
FIG. 3 is a diagram illustrating the detailed configuration of an integer-times motion estimation unit according to an embodiment of the present invention.

FIG. 2 is a diagram illustrating the configuration of a motion estimation apparatus according to an embodiment of the present invention. FIG. 3 is a diagram illustrating the detailed configuration of an integer-times motion estimation unit according to an embodiment of the present invention.

Referring to FIG. 2, a motion estimation apparatus 100 may interlink a frame memory 10, and may include an integer-times motion estimation unit 110, a decimal-times motion estimation unit 120 and a current region memory 130.

The integer-times motion estimation unit 110 may include a shared estimation region memory 111, an integer-times estimation SAD calculator 112, and an integer-times estimation controller 113. The integer-times motion estimation unit 110 predicts the motion vector of a position where the value of the Sum of Absolute Differences (SAD) is the minimum, by use of the pixel data of a current region and the pixel data of an estimation region, and transmits the predicted motion vector and the minimum SAD value to the decimal-times motion estimation unit 120. Herein, the current region means the region of an original picture. The estimation region is a previous region, and means the region of the reference picture of a motion estimation range.

The decimal-times motion estimation unit 120 may include an estimation region selector 121, a decimal-times estimation SAD calculator 122, and a decimal-times estimation controller 123. The decimal-times motion estimation unit 120 calculates an SAD value by use of the pixel data of the original picture and the pixel data of the reference picture from the integer-times motion estimation unit 110 to predict a final decimal-times motion vector, and outputs the predicted decimal-times motion vector and the minimum SAD value. Herein, the reference picture is the picture of an estimation range which is made by adding a periphery estimation range for pixel interpolation to a received periphery pixel range of an integer-times motion vector.

The detailed configuration of the integer-times motion estimation unit 110 will be described with reference to FIG. 3 below.

The shared estimation region memory 111 of the integer-times motion estimation unit 110 includes a current macroblock storage 206 and an estimation region macroblock storage 207. Herein, the estimation region macroblock storage 207 stores the pixel data of an estimation region which are stored to be sharable with the decimal-times motion estimation unit 120.

The shared estimation region memory 111 is connected to the frame memory 10 via a Direct Memory Access (DMA) control unit 30 and a frame memory control unit 20 through a frame memory bus, and reads 48×32×8 bit (pixel) pixel data by 16×32×8 bit (pixel) unit from the frame memory 10. The estimation region macroblock storage 207 of the shared estimation region memory 111 may be divided into an even macroblock storage and an odd macroblock storage. The current macroblock storage 206, which is a shared current picture block memory for storing the 16×64 pixel data of a shared current region may be divided into four banks (which include a bank 00, a bank 01, a bank 10 and a bank 11). The estimation region macroblock storage 207 is divided into a bank 0 to a bank 5 which are a shared picture bank memory for storing the pixel data of an estimation region. Herein, the bank memories may be divided into an upper bank region (which includes a bank 00, a bank 01, a bank 10, a bank 11, a bank 20 and a bank 21) and a lower bank region (which include a bank 30, a bank 31, a bank 40, a bank 41, a bank 50 and a bank 51) for storing the pixel data of the odd macroblock and the even macroblock.

Figure 4:
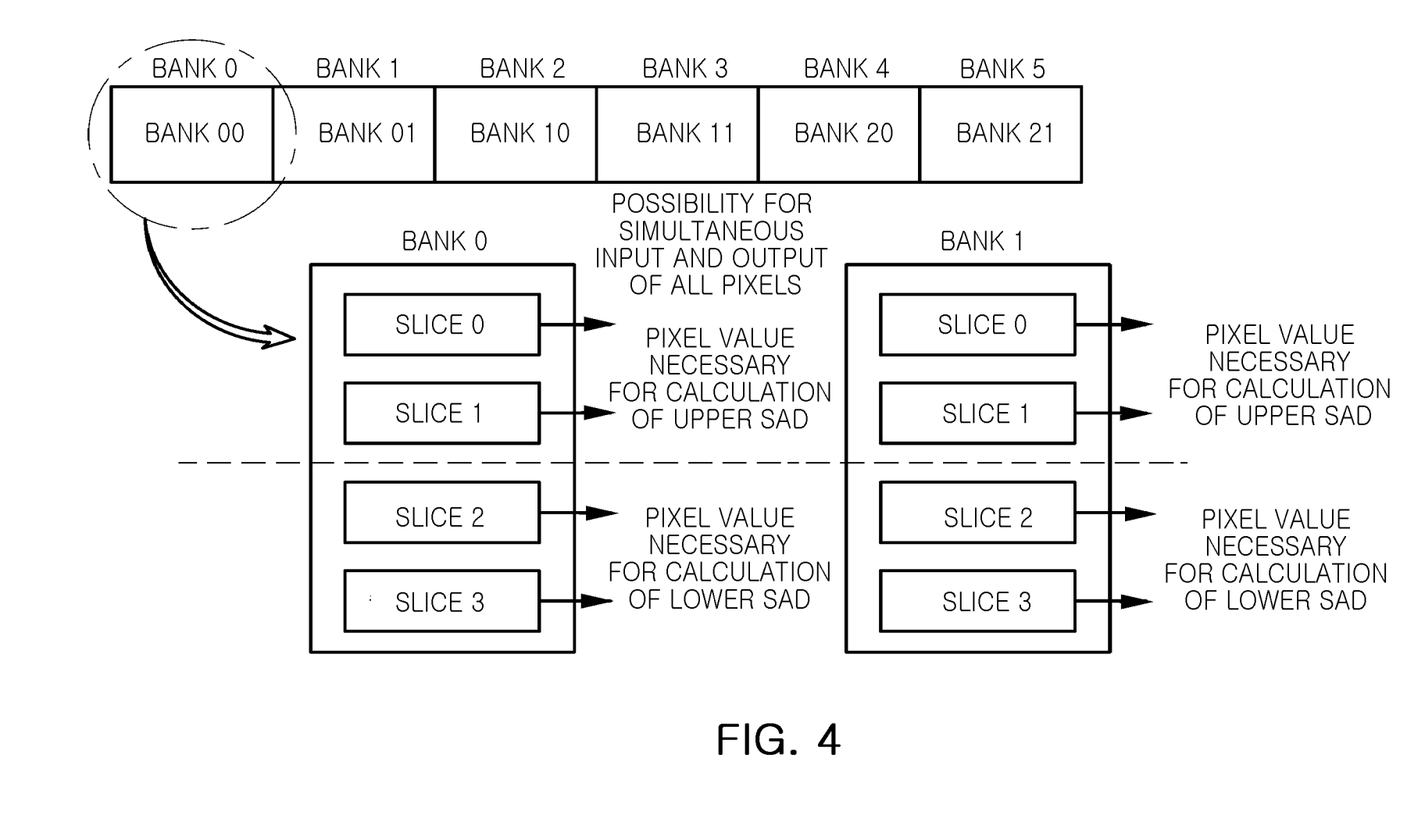
FIG. 4 is a diagram illustrating the detailed structure of an estimated macroblock storage region in FIG. 3.

The each bank memory (which include the bank 0 to the bank 5) of the estimation region macroblock storage 207, as illustrated in FIG. 4, is divided into four slice (which include a slice 0 to a slice 3) memories on the pixel data of a 8×32 unit in a Y direction. In the four slices, all pixel values may simultaneously be inputted and outputted, the slice 0 and the slice 1 outputting a pixel value necessary for the calculation of an upper SAD, and the slice 2 and slice 3 outputting a pixel value necessary for the calculation of a lower SAD. Herein, the each bank memory and slice memory may separately input and output data. In the separate input/output, the multiple inputs/outputs of the memory may simultaneously be made on a plurality of pixel data upon prediction of a motion vector. Therefore, the motion estimation apparatus 100 simultaneously performs SAD calculations on the pixel values of different positions in one macroblock, thereby estimating motion at high speed.

Referring again to FIG. 3, the integer-times SAD calculator 112 includes an upper SAD calculator 201 and a lower SAD calculator 203, and is connected to the current macroblock storage 206 and the estimation region macroblock storage 207 through a local memory bus. The integer-times SAD calculator 201 skips one section and reads the pixel data of the current region and the pixel data of the estimation region from the current macroblock storage 206 and the estimation region macroblock storage 207 respectively, and performs 2:1 subsampling. The integer-times SAD calculator 201 calculates the absolute values of the differences between the 2:1 subsampled current macroblock and the 2:1 subsampled macroblock of the estimation region and obtains SAD values. The integer-times SAD calculator 201 predicts an integer-times motion vector by using the minimum value of the calculated SAD values.

The upper SAD calculator 201 reads the pixel data of the estimation region from the slice 0 and the slice 1 of the each bank memory in FIG. 4 to perform a calculation of the upper SAD, and simultaneously the lower SAD calculator 203 calculates the SAD. The lower SAD calculator 203 reads the pixel data of the estimation region from the slice 2 and the slice 3 of the each bank memory to perform the calculation of the lower SAD. The upper and lower SAD calculations will be described in detail with reference to a motion estimation method.

Referring again to FIG. 3, the integer-times estimation controller 113 of the integer-times motion estimation unit 110 may include a local memory address controller 202, a register 204, a device controller 205, and a frame memory address controller 208. The integer-times estimation controller 113 transmits an estimation region sharable signal to the decimal-times motion estimation unit 120. Herein, the register 204 may be connected to an external device through a system bus to read or write data.

The motion estimation method in the motion estimation apparatus having the above-described configuration will be described in detail with reference to the accompanying drawings below.

First, the following description will be made on conditions for calculation of the SAD and an estimation region for estimating motion.

The motion estimation method performs estimation by 1-pixel unit in X and Y directions. The integer-times motion estimation unit 110 skips one section and reads the pixel data of the current macroblock and the pixel data of the estimation region upon calculation of the SAD, and may perform calculation of the SAD by using the 2:1 subsampled current macroblock and the 2:1 subsampled macroblock of the estimation region.

Figure 5:
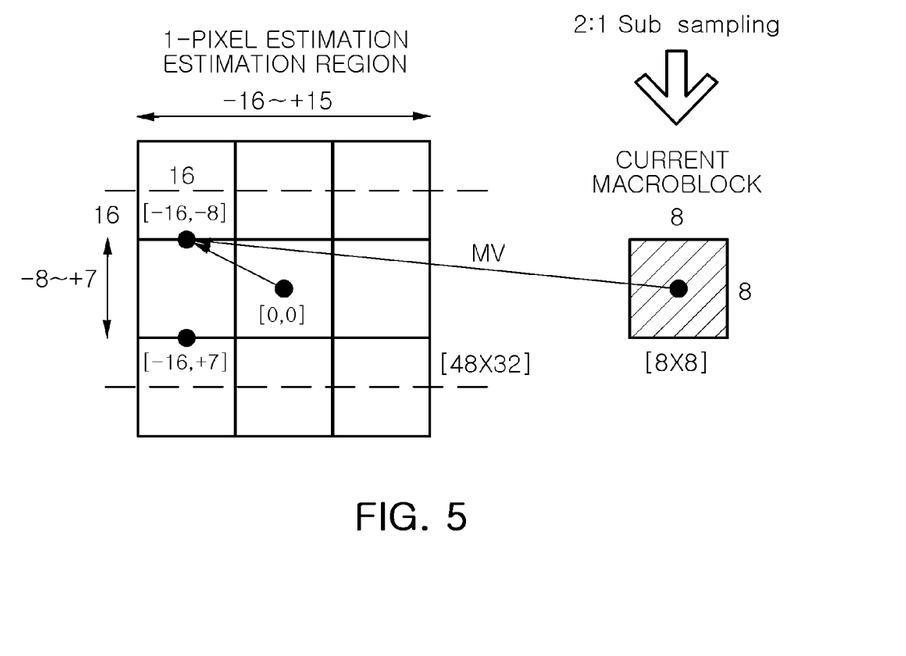
FIG. 5 is a diagram illustrating an estimation region for estimation of motion according to an embodiment of the present invention.

As shown in FIG. 5, the motion estimation method decreases the estimation region to one-half (−8 to +7) in a Y direction for calculating the SAD on the estimation region of 48×32 pixels, and thus reduces an entire amount of calculation required for an estimation of motion.

Figure 6:
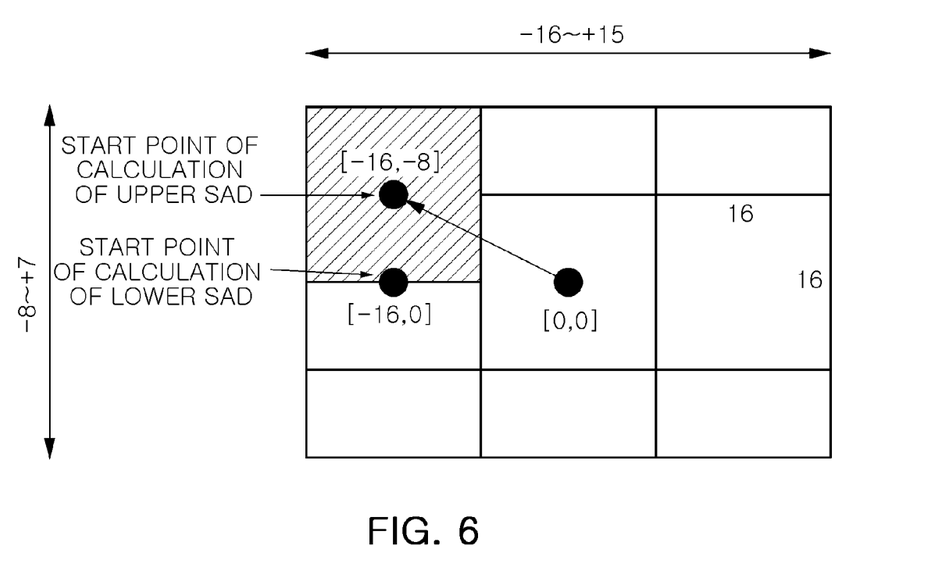
FIG. 6 is a diagram illustrating an expanded estimation region for calculation of a SAD.

FIG. 6 is a diagram illustrating an expanded estimation region for the calculation of the SAD. FIGS. 7A, 7B, 7C, and 7D are diagrams illustrating a method for reading an estimation region upon calculation of the SAD.

Figure 7A:
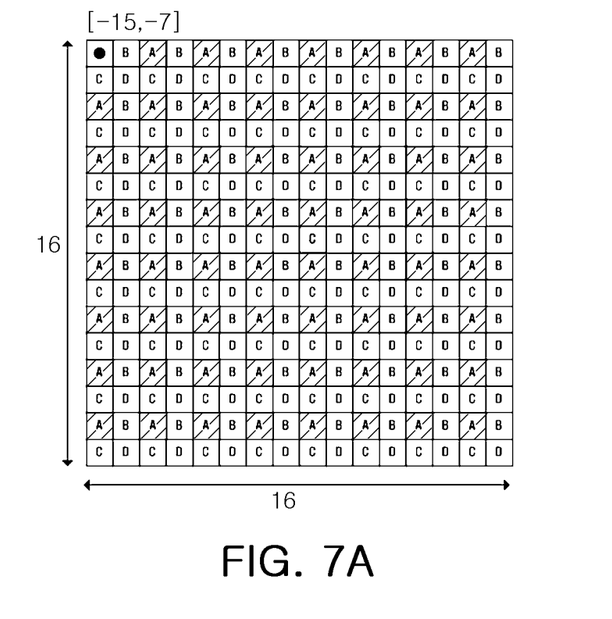
FIG. 7A is a diagram illustrating a method for reading an estimation region upon calculation of a SAD.
Figure 7B:
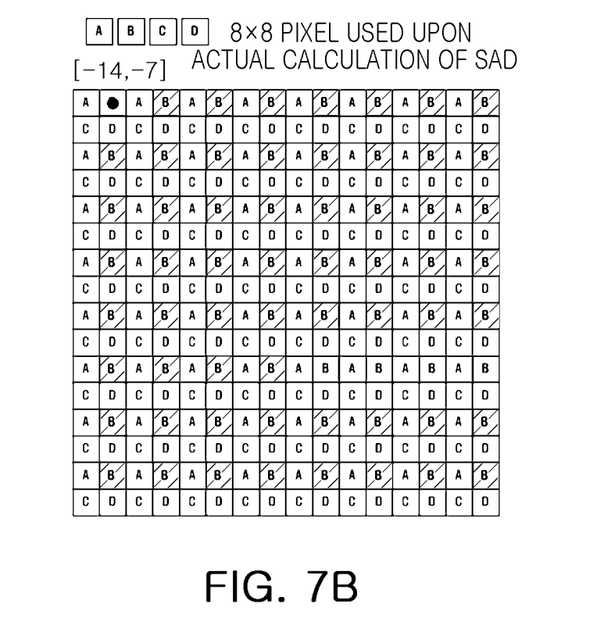
FIG. 7B is a diagram illustrating a method for reading an estimation region upon calculation of a SAD.
Figure 7C:
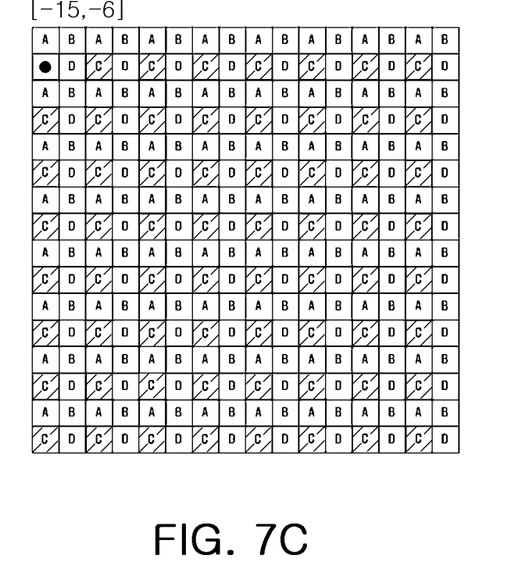
FIG. 7C is a diagram illustrating a method for reading an estimation region upon calculation of a SAD.
Figure 7D:
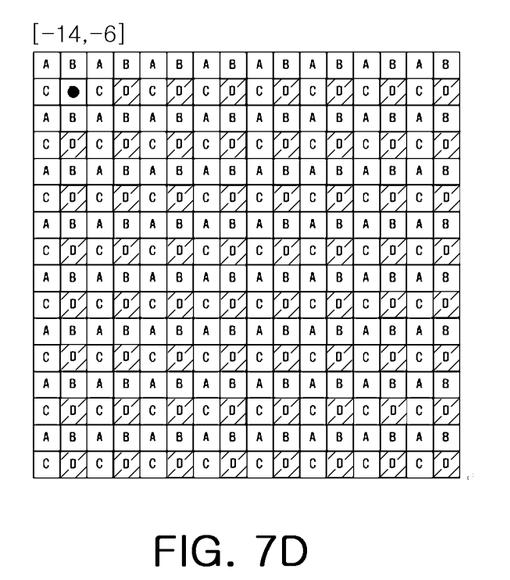
FIG. 7D is a diagram illustrating a method for reading an estimation region upon calculation of a SAD.

Referring to FIGS. 6, 7A, 7B, 7C, and 7D, the motion estimation apparatus calculates the SAD for 2:1 subsampled current pixel data A, B, C and D (8×8) on a 16×16 block. As shown in FIGS. 7A, 7B, 7C, and 7D, the motion estimation apparatus skips one section and reads the 2:1 Subsampled pixel data of the estimation region upon calculation of the SAD. For example, as shown in FIG. 7A, when reading the pixel data A, the integer-times SAD calculator 112 reads the pixel data of a current position [−15, −7], and thereafter, skips one section and sequentially reads the pixel data of a position (which includes oblique-striped regions in FIG. 7A) next to the skipped section.

In the motion estimation range of FIGS. 7A, 7B, 7C, and 7D, for example, when the conditions of an integer-times motion vector are determined within the range of −13 to +12 in an X direction and the range of −5 to +4 in a Y direction, the decimal-times motion estimation unit 120 does not read the pixel data of the reference picture for the decimal-times motion estimation. Alternatively, the decimal-times motion estimation unit 120 reads the pixel data of the estimation region for the reference picture necessary for calculation of the SAD from the estimation region macroblock storage 207 of the decimal-times motion estimation unit 110 to perform the decimal-times motion estimation. In such a decimal-times motion apparatus, the conditions of an integer-times XY motion vector for sharing an integer-times motion estimation memory are expressed as Equation (1) below.

{X: (integer-times motion vector X direction minimum value −3) to (integer-times motion vector X direction maximum value −3)} AND {Y: (integer-times motion vector Y direction minimum value −3) to (integer-times motion vector Y direction maximum value −3)}   (1)

In a test picture and a general picture, the motion vector of an estimation range based on the conditions of the Equation (1) occupies 80% to 90% of the calculation capacity? upon estimation of motion (which is a experiment result), and thus the probability that the integer-times motion estimation unit 110 and the decimal-times motion estimation unit 120 share the memory of the estimation range of the reference picture increases.

An integer-times motion estimation process will be described in detail with reference to the accompanying drawings on the basis of the above description.

Figure 8:
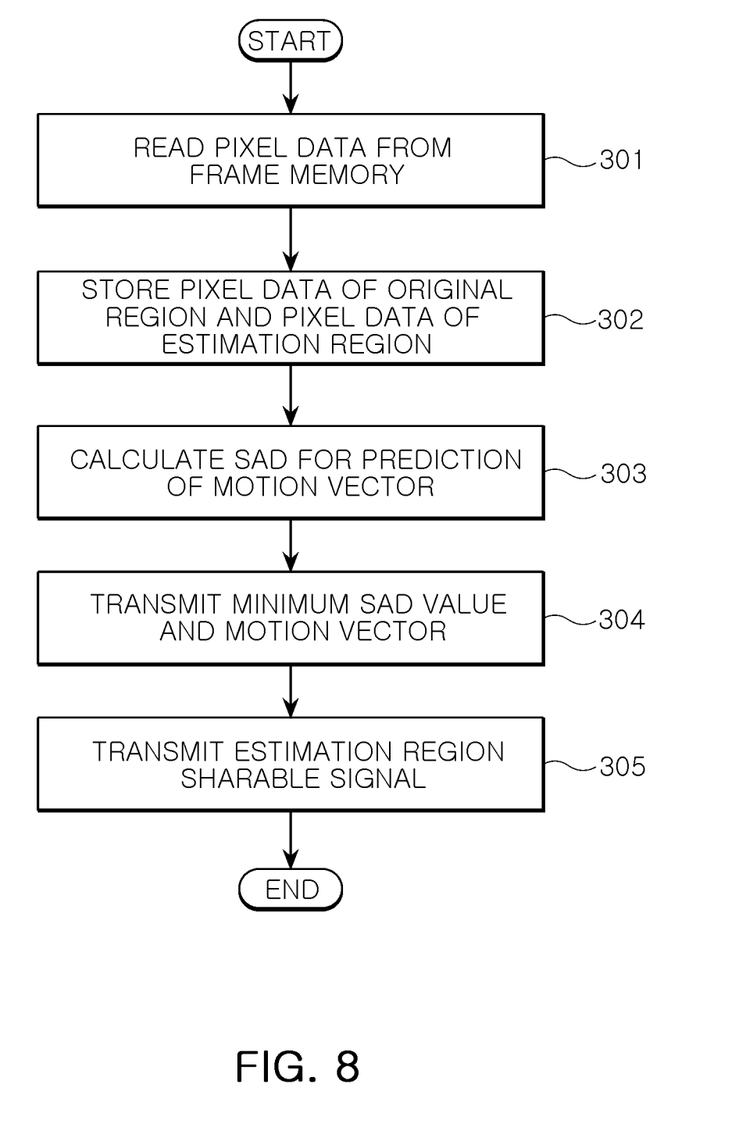
FIG. 8 is a diagram illustrating a high-speed motion estimation method in a high-speed motion estimation apparatus according to an embodiment of the present invention.

FIG. 8 is a diagram illustrating a high-speed motion estimation method in the high-speed motion estimation apparatus according to an embodiment of the present invention.

Referring to FIGS. 3 and 8, the integer-times motion estimation unit 110 of the motion estimation apparatus 100 reads the pixel data of 48×32×8 bit (pixel) by 16×32×8 bit (pixel) unit from the frame memory 10 in operation 301. At this point, the current region memory 130 reads and stores the pixel data of the 16×32×8 bit (pixel) unit.

Accordingly, the integer-times motion estimation unit 110 stores the pixel data of the current region of a picture in the current macroblock storage 206, and stores the pixel data of a previous region, that is, the pixel data of the estimation region in the estimation region macroblock storage 207 sharable with the decimal-times motion estimation unit 120 in operation 302. That is, the estimation region macroblock storage 207 sequentially stores pixel data (which is read data) necessary for estimation in six bank memories by a 22×8 unit in an X direction. At this point, the pixel data of the estimation region of an even macroblock are stored in an even macroblock storage of the upper portion of the estimation region macroblock storage 207, and the pixel data of the estimation region of an odd macroblock are stored in an odd macroblock storage of the lower portion of the estimation region macroblock storage 207. The storage of the data is alternatively performed per macroblock. When sharing the integer-times estimation region and the decimal-times estimation region, a previous shared data for decimal-times estimation is effective even after the integer-times estimation of one macroblock is completed.

Subsequently, the prediction of the motion vector is performed for the integer-times motion estimation. Accordingly, the integer-times motion estimation unit 110 performs a calculation of the SAD for the prediction of the motion vector by macroblock unit on the estimation region of 48×32 pixels which are stored in the shared estimation region memory 111 in operation 303. In prediction of the motion vector, the integer-times motion estimation unit 110 reads the pixel data of a new estimation region per macroblock from the frame memory 10. At this point, the banks of a stored position are automatically rotated, and estimation of the motion is always started from the position of a left upper portion [−16, −8] and a left middle portion [−16, 0] upon calculation of the SAD. Therefore, the following description will be made on calculation of the SAD for estimation of the motion vector.

The integer-times estimation SAD calculator 111 of the integer-times motion estimation unit 110, as illustrated in FIG. 2, simultaneously calculates the upper SAD and the lower SAD by use of the left upper portion [−16, −8] and the left middle portion [−16, 0] in an XY direction as a start point in order to speedup an estimation time upon calculation of the SAD. That is, the upper SAD calculator 201 reads the pixel values necessary for the calculation of the upper SAD which are stored in the slice 0 and the slice 1 of a corresponding bank memory in order to perform the motion estimation prediction of an upper portion ($\{X,Y\}=\{-16$ to $+15, -8$ to $-1\}$) which is above the left middle portion [−16, 0] being a predetermined reference point. Next, the upper SAD calculator 201 performs calculation of the upper SAD by using the read pixel values. Afterwards, when all calculations of the upper SAD have been completed, the upper SAD calculator 201 calculates a first minimum SAD value having the minimum value among the accumulated SAD values and outputs it to the lower SAD calculator 203. Simultaneously, the lower SAD calculator 203 reads the pixel values necessary for the calculation of the lower SAD which are stored in the slice 2 and the slice 3 of a corresponding bank memory in order to perform the motion estimation prediction of a lower portion ($\{X, Y\}=\{-16$ to $+15, 0$ to $+7\}$) which is in the down portion of the estimation region below the left middle portion [−16, 0]. Subsequently, the lower SAD calculator 203 performs a calculation of the lower SAD by using the read pixel values. When all calculation of the lower SAD has been completed, the lower SAD calculator 203 calculates a second minimum SAD value having the minimum value among the plurality of calculated SAD values. The lower SAD calculator 203 calculates a final minimum SAD value having a relatively small value among the first and second minimum SAD values, and predicts an integer-times motion vector by using the calculated final minimum SAD value.

When calculations of the upper SAD and the lower SAD have been completed, the integer-times motion estimation unit 110 transmits the minimum SAD value obtained through calculation of the SAD and the predicted motion vector to decimal-times motion estimation unit 120 in operation 304. That is, the lower SAD calculator 203 compares the calculated second minimum SAD value with the first minimum SAD value inputted from the upper SAD calculator 201 to transmit the SAD value having a relative minimum value among the first and second minimum SAD values. Moreover, the lower SAD calculator 203 finally outputs a motion vector for the transmitted minimum SAD value to transmit it to the decimal-times motion estimation unit 120.

Subsequently, the integer-times motion estimation unit 110 transmits an estimation region sharable signal to the decimal-times motion estimation unit 120 through the internal register 204 for control of a system so that the decimal-times motion estimation unit 120 may share the estimation region macroblock storage 207 in operation 305. Accordingly, the decimal-times motion estimation unit 120 reads the pixel data of a sharable estimation region which are stored in the estimation region macroblock storage 207 and performs calculation of the SAD for predicting a decimal-times motion vector.

Exemplary embodiments of the present invention implement the shared estimation region memory having the multiple input/output bank memory structure sharable with the decimal-times motion estimation unit in the integer-times motion estimation unit, thereby minimizing inputs/outputs with the external frame memory. Moreover, exemplary embodiments of the present invention simultaneously input and output the pixel data (which are the estimation region pixel data) necessary for the calculation of the SAD which are stored in the multiple input/output bank memories, thereby estimating motion at high speed. Consequently, exemplary embodiments of the present invention can decrease the number of pixels and the estimation range necessary for the calculation of the SAD while not deteriorating the quality of pictures upon prediction of the motion vector.

While the present invention has been shown and described in connection with the exemplary embodiments, it will be apparent to those skilled in the art that modifications and variations can be made without departing from the spirit and scope of the invention as defined by the appended claims.

What is claimed is:

1. A high-speed motion estimation apparatus, comprising:
   a current region memory receiving pixel data of a current region from an external frame memory to store the pixel data;
   an integer-times motion estimation unit storing pixel data of an estimation region which are read from the frame memory in a sharable multiple input/output bank type, and predicting an integer-times motion vector by using the pixel data of the current region and the pixel data of the estimation region; and a decimal-times motion estimation unit reading the pixel data of the estimation region from the integer-times motion estimation unit, and predicting a decimal-times motion vector by using the read pixel data of the estimation region and the integer-times motion vector predicted by the integer-times motion estimation unit, when an estimation region sharable signal is received from the integer-times motion estimation unit.

2. The high-speed motion estimation apparatus of claim 1, wherein the integer-times motion estimation unit comprises:

a shared estimation region memory comprising an estimation region macroblock storage of the sharable multiple input/output bank types, and storing pixel data of an estimation region sharable with the decimal-times motion estimation unit in the estimation region macroblock storage;

a sum calculator for integer-times estimation absolute differences calculating a Sum of Absolute Differences (SAD) for a prediction of the integer-times motion vector by using the pixel data of the current region and the pixel data of the estimation region; and an integer-times estimation controller transmitting the estimation region sharable signal to the decimal-times motion estimation unit.

3. The high-speed motion estimation apparatus of claim 2, wherein the estimation region macroblock storage comprises a plurality of bank memories where multiple inputs/outputs are made, and is divided into an even macroblock storage and an odd macroblock storage, and stores the pixel data of the sharable estimation region by macroblock unit in the bank memories.

4. The high-speed motion estimation apparatus of claim 3, wherein the bank memories comprise:

one or more slices storing a pixel value necessary for a calculation of a sum of upper absolute differences for predicting motion estimation of an upper portion which is above a predetermined reference point; and one or more other slices storing a pixel value necessary for a calculation of a sum of lower absolute differences for simultaneously predicting motion estimation of a lower portion which is below the predetermined reference point.

5. The high-speed motion estimation apparatus of claim 2, wherein the sum calculator for the integer-times estimation absolute differences reads the pixel data of the current region and the pixel data of the estimation region by skipping one section, calculates absolute differences between a 2:1 sub-sampled current macroblock and a 2:1 subsampled macroblock of an estimation region, calculates a Sum of the Absolute Differences (SAD), and outputs the minimum value of the calculated SAD values to the decimal-times motion estimation unit.

6. The high-speed motion estimation apparatus of claim 5, wherein the sum calculator for the integer-times estimation absolute differences comprises:

a sum calculator for upper absolute differences calculating a sum of upper absolute differences for predicting motion estimation of an upper portion which is above a predetermined point to obtain a first minimum SAD value; and a sum calculator for lower absolute differences calculating a sum of lower absolute differences for predicting motion estimation of a lower portion which is below the predetermined point at same time with the sum calculator for upper absolute differences, to calculate a second minimum SAD value.

7. The high-speed motion estimation apparatus of claim 6, wherein the sum calculator for lower absolute differences compares the first minimum SAD value with the second minimum SAD value, and transmits the integer-times motion vector and the minimum value of the first and second SAD values to the decimal-times motion estimation unit.

* * * * *